(12) United States Patent
Abotabl et al.

(10) Patent No.: US 12,464,474 B2
(45) Date of Patent: Nov. 4, 2025

(54) TRANSMIT POWER CONTROL IN FULL-DUPLEX WIRELESS COMMUNICATION

(71) Applicant: QUALCOMM Incorporated, San Diego, CA (US)

(72) Inventors: Ahmed Attia Abotabl, San Diego, CA (US); Muhammad Sayed Khairy Abdelghaffar, San Jose, CA (US); Abdelrahman Mohamed Ahmed Mohamed Ibrahim, San Diego, CA (US); Gokul Sridharan, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 523 days.

(21) Appl. No.: 17/820,490

(22) Filed: Aug. 17, 2022

(65) Prior Publication Data

US 2024/0064654 A1     Feb. 22, 2024

(51) Int. Cl.
*H04W 52/18*     (2009.01)
*H04W 52/14*     (2009.01)
*H04L 5/14*     (2006.01)

(52) U.S. Cl.
CPC ......... *H04W 52/18* (2013.01); *H04W 52/146* (2013.01); *H04L 5/14* (2013.01)

(58) Field of Classification Search
CPC ... H04W 52/04; H04W 52/14; H04W 52/146; H04W 52/18; H04W 52/22; H04W 52/221; H04W 52/223; H04W 52/24; H04W 52/241; H04W 52/243; H04W 52/245; H04W 52/38; H04W 42/383; H04W 52/386; H04W 72/0446; H04W 72/0473; H04L 5/00; H04L 5/0091; H04L 5/14; H04L 5/16
See application file for complete search history.

(56) References Cited

U.S. PATENT DOCUMENTS

| 8,311,053 | B2 * | 11/2012 | Choi | H04W 52/54 370/442 |
| 10,044,491 | B2 * | 8/2018 | Hsu | H04W 52/243 |
| 10,779,241 | B2 * | 9/2020 | Zhang | H04W 52/04 |
| 12,101,180 | B2 * | 9/2024 | Ioffe | H04W 52/245 |

* cited by examiner

*Primary Examiner* — Quochien B Vuong
(74) *Attorney, Agent, or Firm* — Arent Fox, LLP

(57) ABSTRACT

In a wireless communication network, a user equipment (UE) determined a power control adjustment state (PCAS) for a transmission occasion based on a duplex mode of the transmission occasion by one or more of: using a PCAS function specific to the duplex mode of the transmission occasion; using a separate set of PCAS index values for each duplex communication mode; accumulating transmit power control (TPC) command values for half-duplex transmission occasions separately from accumulating TPC command values for full-duplex transmission occasions; interpreting a TPC command based on the duplex mode for the transmission occasion; and determining one of an accumulated PCAS and an absolute PCAS based on one of: i) an accumulated/absolute configuration of the half-duplex mode communication mode of the network device, ii) a radio resource control full-duplex mode communication mode accumulated/absolute parameter of the network device, and iii) a network device-configured full-duplex mode communication mode accumulated/absolute parameter.

32 Claims, 8 Drawing Sheets

500

Determine, by a network device capable of both half-duplex and full-duplex communication, a power control adjustment state (PCAS) for a particular transmission occasion based on a duplex mode of the particular transmission occasion.
510

↓

Transmit, by the device in uplink during the particular transmission occasion, with a transmission power based on the determined PCAS.
520

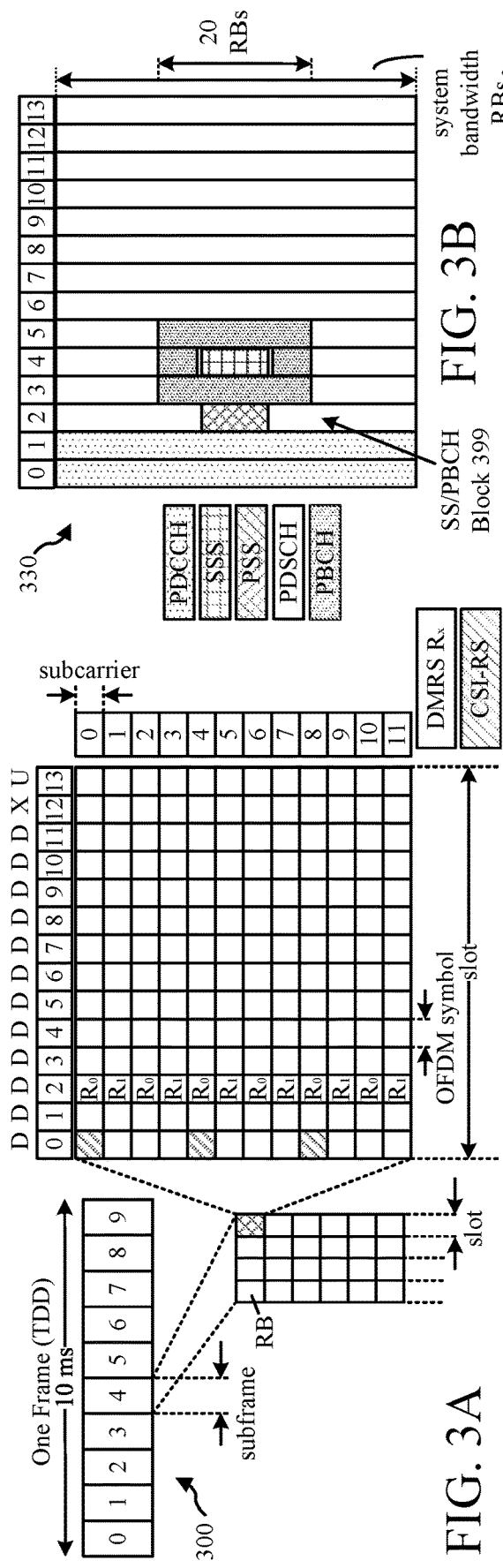
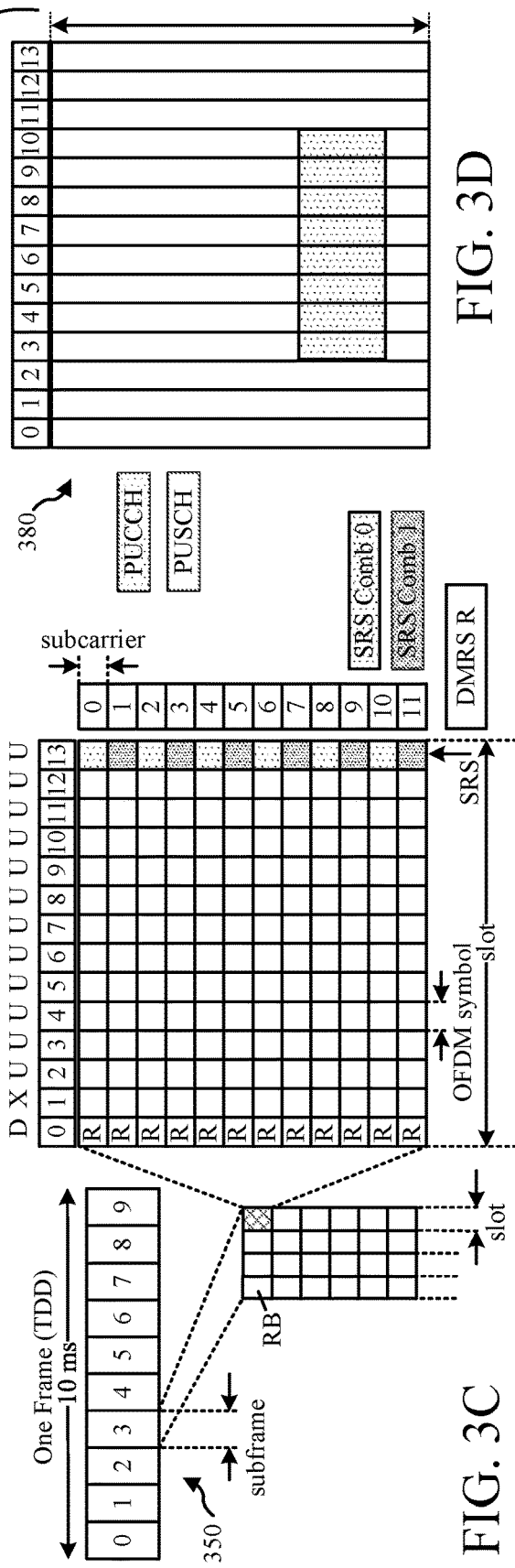
FIG. 3A
FIG. 3B
FIG. 3C
FIG. 3D

TRANSMIT POWER CONTROL IN FULL-DUPLEX WIRELESS COMMUNICATION

TECHNICAL FIELD

The present disclosure relates generally to communication systems, and more particularly in some examples, to transmit power control in full-duplex capable wireless communication.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems. These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

Examples of the technology disclosed herein differentiate between half-duplex mode transmission occasions and full-duplex mode transmission occasions when determining transmission power in a user equipment (UE) for those transmission occasions—in part to allow mitigation of inter-UE cross link interference (CLI) and UE self-interference seen in full-duplex mode communications. The technology disclosed herein includes method, apparatus, and computer-readable media including instructions for wireless communication. Such technology finds use in the context of a UE capable of both half-duplex mode communication and full-duplex mode communication. In such technology, the UE determines a power control adjustment state (PCAS) for a particular transmission occasion based on a duplex mode of the particular transmission occasion. The UE then transmits, in uplink during the particular transmission occasion, with a transmission power based on the determined PCAS.

In some examples, determining includes determining the PCAS using a PCAS function specific to the duplex mode of the particular transmission occasion. In some examples, the PCAS is a function of an index l, where l is a value from a plurality of sets of PCAS index values. In such examples, the sets of PCAS index values comprise a separate set of PCAS index values for each duplex communication mode.

In some examples, determining a PCAS includes accumulating transmit power control (TPC) command values for half-duplex transmission occasions separately from accumulating TPC command values for full-duplex transmission occasions. In some such examples, accumulating TPC command values for a given transmission occasion includes accumulating TPC command values only during one or more transmission occasions of a same duplex mode as the given transmission occasion. In some such examples, accumulating TPC command values for a given transmission occasion includes accumulating TPC command values as indicated by a network in which the network device operates.

In some examples, determining a PCAS includes interpreting a transmit power control (TPC) command based on the duplex mode for the transmission occasion. In some examples, determining a PCAS for a full-duplex transmission occasion includes determining one of an accumulated PCAS and an absolute PCAS based on one of: i) an accumulated/absolute configuration of the half-duplex mode communication mode of the network device, ii) a radio resource control (RRC) full-duplex mode communication mode accumulated/absolute parameter of the network device, and iii) a network device-configured full-duplex mode communication mode accumulated/absolute parameter.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 3A, FIG. 3B, FIG. 3C, and FIG. 3D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
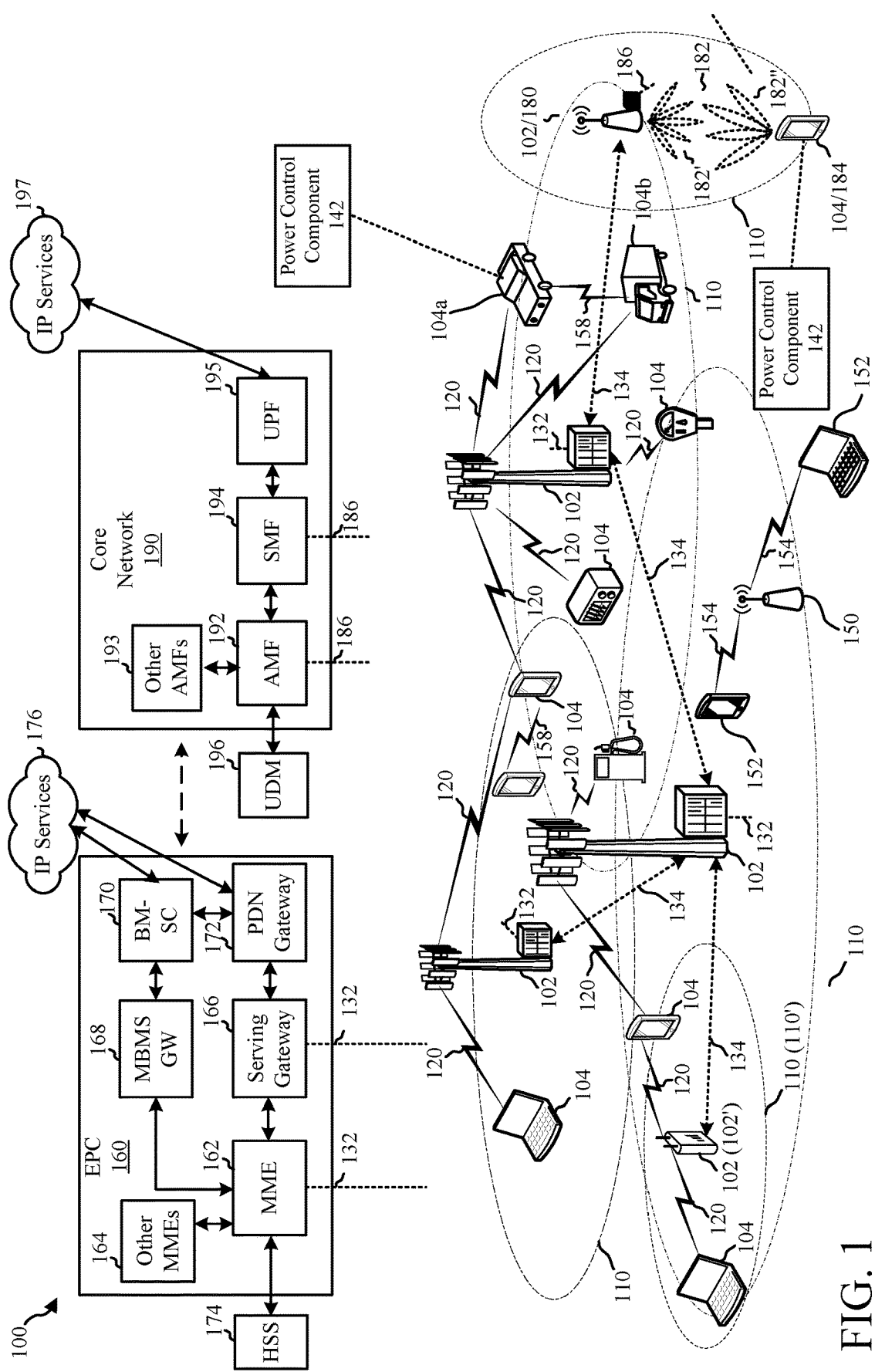
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

In 5G NR, uplink transmit power control for certain channels (e.g., physical uplink shared channel (PUSCH), physical uplink control channel (PUCCH)) and certain signals (e.g., sounding reference signal (SRS)) of a device (e.g., a UE) for a transmission occasion i can be determined by the device on a transmission occasion-by-transmission occasion basis as the minimum of a i) a maximum transmission power of the device, and ii) the sum of several factors including a power control adjustment state (PCAS). The PCAS can be dependent on either i) an absolute transmit power control (TPC) value communicated from the network in a TPC command, or ii) a set of TPC values communicated from the network and accumulated at the device over a number of symbols prior to the transmission occasion i.

A typical TPC command is sent from a base station to a UE as one or more bits—the value of which is then mapped to an incremental or absolute change in the PCAS held in memory one or more "tables" in the UE. This approach can be used separately for each of PUSCH, PUCCH, and SRS. For example, a UE can receive a two-bit TPC command value of {1,0} for PUSCH corresponding to an incremental change +1 dB of increased transmit power for a given PUSCH transmission occasion i, and then another a two-bit TPC command value of {1,1} for PUSCH corresponding to an incremental change +3 dB for the PUSCH transmission occasion i. This results in an accumulated +4 dB increase in transmit power for PUSCH transmission occasion i, e.g., to meet a required signal-to-noise ratio (SNR) or bit error ratio (BER) at a corresponding base station receiving the transmission. On the other hand in this example, a UE can receive a two-bit TPC command value of {0,0} for PUCCH corresponding to an absolute change to −4 dB transmit power for a given PUCCH transmission occasion i, e.g., to reduce the effect of co-channel interference.

A wireless communication system operating in half-duplex mode allows communication in both directions (e.g., uplink and downlink), but in only one direction at a time. A wireless communication system operating in full-duplex mode allows simultaneous communication in both directions. In a 5G NR system capable of both half-duplex mode communication and full-duplex mode communication on a slot-by-slot basis, the transmission power control considerations are different for each duplex mode. For example, full-duplex communications are subject to inter-UE cross link interference (CLI) and self-interference that are not significant factors in half-duplex communications.

Examples of the technology disclosed herein differentiate between half-duplex mode transmission occasions and full-duplex mode transmission occasions when determining transmission power for those transmission occasions—in part to allow mitigation of inter-UE CLI and UE self-interference seen in full-duplex mode communications. The technology disclosed herein includes method, apparatus, and computer-readable media including instructions for wireless communication. Such technology finds use in the context of a UE capable of both half-duplex mode communication and full-duplex mode communication. In such technology, the UE determines a power control adjustment state (PCAS) for a particular transmission occasion based on a duplex mode of the particular transmission occasion. The UE then transmits, in uplink during the particular transmission occasion, with a transmission power based on the determined PCAS.

In some examples, determining includes determining the PCAS using a PCAS function specific to the duplex mode of the particular transmission occasion. In some examples, the PCAS is a function of an index l, where l is a value from a plurality of sets of PCAS index values. In such examples, the sets of PCAS index values comprise a separate set of PCAS index values for each duplex communication mode.

In some examples, determining a PCAS includes accumulating transmit power control (TPC) command values for half-duplex transmission occasions separately from accumulating TPC command values for full-duplex transmission occasions. In some such examples, accumulating TPC command values for a given transmission occasion includes accumulating TPC command values only during one or more transmission occasions of a same duplex mode as the given transmission occasion. In some such examples, accumulating TPC command values for a given transmission occasion includes accumulating TPC command values as indicated by a network in which the network device operates.

In some examples, determining a PCAS includes interpreting a transmit power control (TPC) command based on the duplex mode for the transmission occasion. In some examples, determining a PCAS for a full-duplex transmission occasion includes determining one of an accumulated PCAS and an absolute PCAS based on one of: i) an accumulated/absolute configuration of the half-duplex mode communication mode of the network device, ii) a radio resource control (RRC) full-duplex mode communication mode accumulated/absolute parameter of the network device, and iii) a network device-configured full-duplex mode communication mode accumulated/absolute parameter.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system. By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells. The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 186. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first, second and third backhaul links 132, 186 and 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. In some examples of the technology disclosed herein, both the DL and the UL between the base station and a UE use the same set of multiple beams to transmit/receive physical channels. For example, a given set of beams can carry the multiple copies of a Physical Downlink Shared Channel (PDSCH) on the DL and can carry multiple copies of a Physical Uplink Control Channel (PUCCH) on the UL. In some examples of the technology disclosed herein, the base stations 102 and the UEs 104 are capable of both half-duplex mode communication and full-duplex mode communication on a slot-by-slot basis over the communications links 120.

The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) in communication with Wi-Fi stations (STAs) 152 via communication links 154 in a 5 GHz unlicensed frequency spectrum. When communicating in an unlicensed frequency spectrum, the STAs 152/AP may perform a clear channel assessment (CCA) prior to communicating in order to determine whether the channel is available. The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in one or more frequency bands within the electromagnetic spectrum. The base station 180 and the UE 104 may each include a plurality of antennas, such as antenna elements, antenna panels, and/or antenna arrays to facilitate the beamforming.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming with the UE 104/184 to compensate for the path loss and short-range using beams 182.

The base station 180 may transmit a beamformed signal to the UE 104/184 in one or more transmit directions 182'. The UE 104/184 may receive the beamformed signal from the base station 180 in one or more receive directions 182". The UE 104/184 may also transmit a beamformed signal to the base station 180 in one or more transmit directions. The base station 180 may receive the beamformed signal from the UE 104 in one or more receive directions. The base station 180/UE 104/184 may perform beam training to determine the best receive and transmit directions for each of the base station 180/UE 104/184. The transmit and receive directions for the base station 180 may or may not be the same. The transmit and receive directions for the UE 104/184 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a packet-switched (PS) Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides quality of service (QoS) flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the following description may be focused on 5G NR, the concepts described herein may be applicable to other similar areas, such as LTE, LTE-A, CDMA, GSM, and other wireless technologies.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 2:
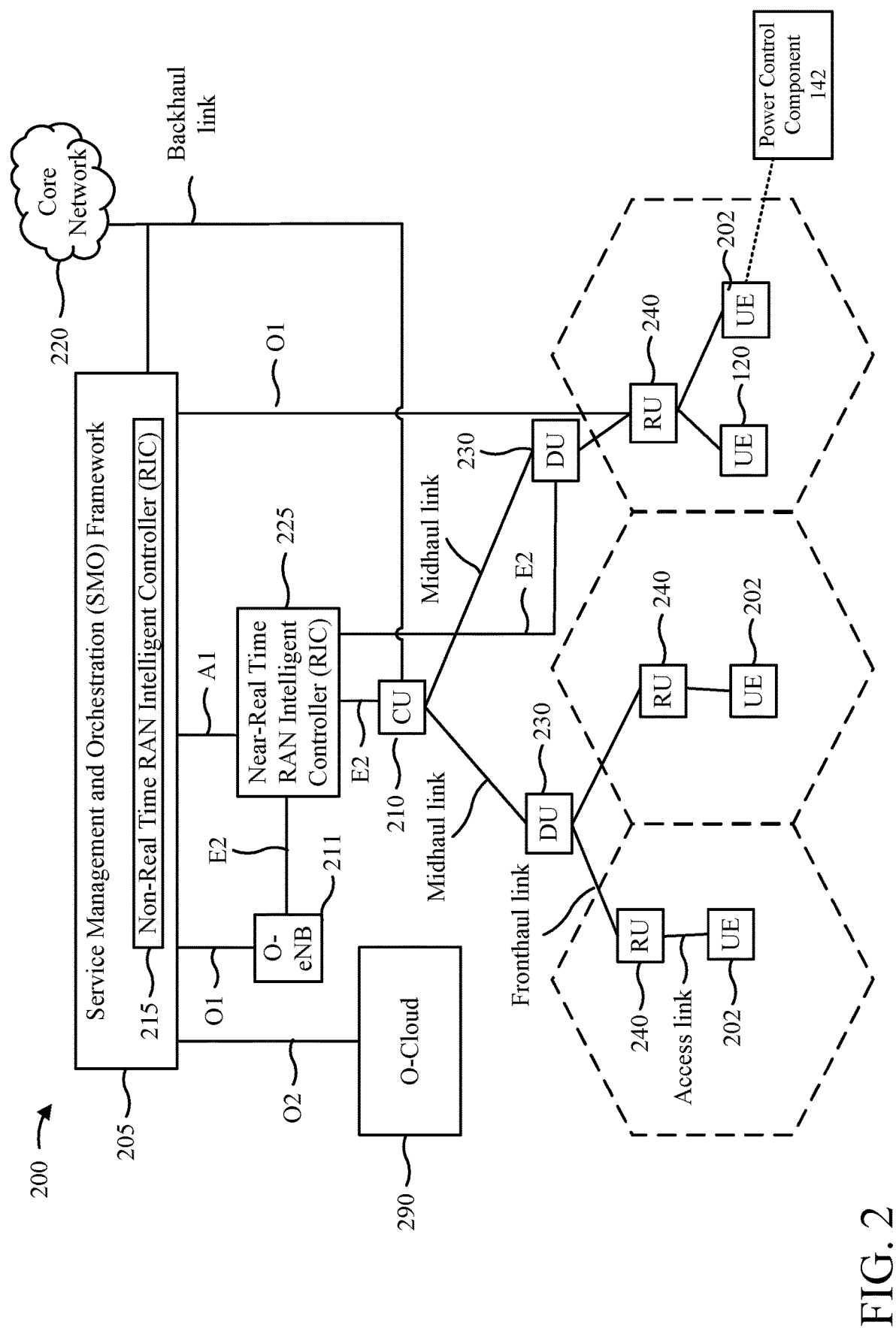
FIG. 2 is a diagram illustrating an example disaggregated base station 200 architecture

FIG. 2 shows a diagram illustrating an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 202 via one or more radio frequency (RF) access links. In some implementations, the UE 202 may be simultaneously served by multiple RUs 240.

Each of the units, i.e., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (i.e., Central Unit—User Plane (CU-UP)), control plane functionality (i.e., Central Unit—Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communication with one or more UEs 202. In some implementations, real-time and non-real-time aspects of control and user plane communication with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

FIG. 3A is a diagram 300 illustrating an example of a first subframe within a 5G/NR frame structure. FIG. 3B is a diagram 330 illustrating an example of DL channels within a 5G/NR subframe. FIG. 3C is a diagram 350 illustrating an example of a second subframe within a 5G/NR frame structure. FIG. 3D is a diagram 380 illustrating an example of UL channels within a 5G/NR subframe. The 5G/NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 3A, 3C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 3A-3D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS). Some examples of the technology disclosed herein use the DM-RS of the physical downlink control channel (PDCCH) to aid in channel estimation (and eventual demodulation of the user data portions) of the physical downlink shared channel (PDSCH).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARM) acknowledgment (ACK)/negative ACK (NACK) feedback. The PUSCH carries data and may additionally be used to carry a buffer status report (BSR), a power headroom report (PHR), and/or UCI.

Figure 4:
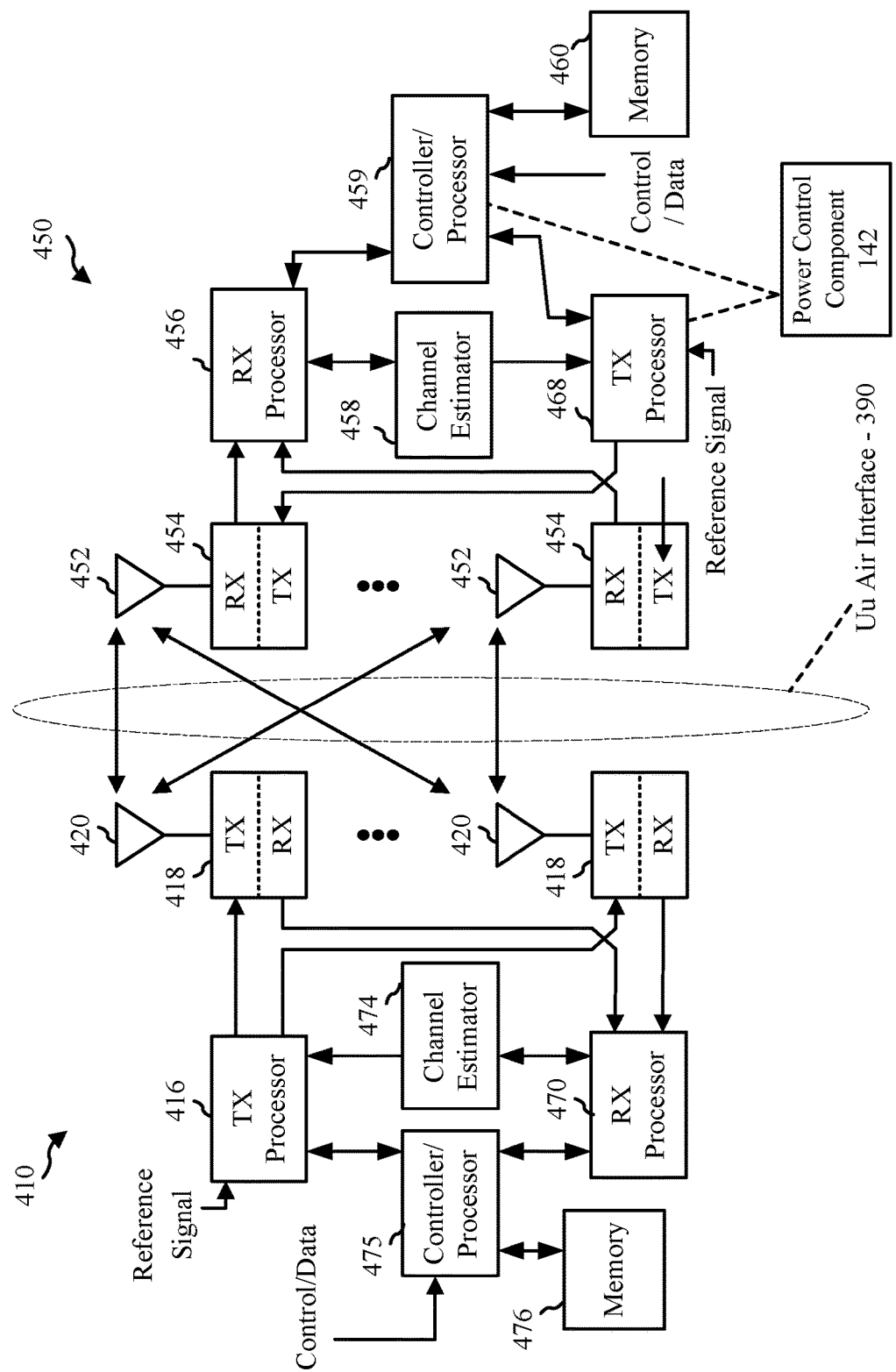
FIG. 4 is a diagram illustrating a base station and user equipment (UE) in an access network, in accordance with examples of the technology disclosed herein.

FIG. 4 is a block diagram of a base station 410 in communication with a UE 450 in an access network. In the DL, IP packets from the EPC 160 may be provided to a controller/processor 475. The controller/processor 475 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 475 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 416 and the receive (RX) processor 470 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 416 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 474 may be used to determine the coding and modulation scheme, as well as for spatial processing. The channel estimate may be derived from a reference signal and/or channel condition feedback transmitted by the UE 450. Each spatial stream may then be provided to a different antenna 420 via a separate transmitter 418TX. Each transmitter 418TX may modulate a radio frequency (RF) carrier with a respective spatial stream for transmission.

At the UE 450, each receiver 454RX receives a signal through its respective antenna 452. Each receiver 454RX recovers information modulated onto an RF carrier and provides the information to the receive (RX) processor 456. The TX processor 468 and the RX processor 456 implement layer 1 functionality associated with various signal processing functions. The RX processor 456 may perform spatial processing on the information to recover any spatial streams destined for the UE 450. If multiple spatial streams are destined for the UE 450, they may be combined by the RX processor 456 into a single OFDM symbol stream. The RX processor 456 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 410. These soft decisions may be based on channel estimates computed by the channel estimator 458. The soft decisions are then decoded and deinterleaved to recover the data and control signals that were originally transmitted by the base station 410 on the physical channel. The data and control signals are then provided to the controller/processor 459, which implements layer 3 and layer 2 functionality.

The controller/processor 459 can be associated with a memory 460 that stores program codes and data. The memory 460 may be referred to as a computer-readable medium. In the UL, the controller/processor 459 provides demultiplexing between transport and logical channels, packet reassembly, deciphering, header decompression, and control signal processing to recover IP packets from the EPC 160. The controller/processor 459 is also responsible for error detection using an ACK and/or NACK protocol to support HARQ operations.

Similar to the functionality described in connection with the DL transmission by the base station 410, the controller/processor 459 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 458 from a reference signal or feedback transmitted by the base station 410 may be used by the TX processor 468 to select the appropriate coding and modulation schemes, and to facilitate spatial processing. The spatial streams generated by the TX processor 468 may be provided to different antenna 452 via separate transmitters 454TX. Each transmitter 454TX may modulate an RF carrier with a respective spatial stream for transmission.

In some examples of the technology disclosed herein, one or both of the controller/processor 459 and the TX processor 468 are used to differentiate between half-duplex mode transmission occasions and full-duplex mode transmission occasions when determining transmission power for those transmission occasions—in part to allow mitigation of inter-UE CLI and UE self-interference seen in full-duplex mode communications. Such technology finds use in the context of a UE 450 capable of both half-duplex mode communication and full-duplex mode communication. In such technology, the UE 450 (using one or both of the controller/processor 459 and the TX processor 468) determines a power control adjustment state (PCAS) for a particular transmission occasion based on a duplex mode of the particular transmission occasion. The UE 450 (using one or both of the controller/processor 459 and the TX processor 468) then transmits, in uplink during the particular transmission occasion, with a transmission power based on the determined PCAS.

In some examples, determining includes determining the PCAS using a PCAS function specific to the duplex mode of the particular transmission occasion. In some examples, the PCAS is a function of an index l, where l is a value from a plurality of sets of PCAS index values. In such examples, the sets of PCAS index values comprise a separate set of PCAS index values for each duplex communication mode.

In some examples, determining a PCAS includes the UE 450 accumulating transmit power control (TPC) command values for half-duplex transmission occasions separately from accumulating TPC command values for full-duplex transmission occasions. In some such examples, accumulating TPC command values for a given transmission occasion includes the UE 450 accumulating TPC command values only during one or more transmission occasions of a same duplex mode as the given transmission occasion. In some such examples, accumulating TPC command values for a given transmission occasion includes accumulating TPC command values as indicated by a network in which the network device operates.

In some examples, the UE 450 determining a PCAS includes interpreting a transmit power control (TPC) command based on the duplex mode for the transmission occasion. In some examples, determining a PCAS for a full-duplex transmission occasion includes determining one of an accumulated PCAS and an absolute PCAS based on one of: i) an accumulated/absolute configuration of the half-duplex mode communication mode of the network device, ii) a radio resource control (RRC) full-duplex mode communication mode accumulated/absolute parameter of the network device, and iii) a network device-configured full-duplex mode communication mode accumulated/absolute parameter.

The UL transmission is processed at the base station 410 in a manner similar to that described in connection with the receiver function at the UE 450. Each receiver 418RX receives a signal through its respective antenna 420. Each receiver 418RX recovers information modulated onto an RF carrier and provides the information to a RX processor 470.

The controller/processor 475 can be associated with a memory 476 that stores program codes and data. The memory 476 may be referred to as a computer-readable medium. In the UL, the controller/processor 475 provides demultiplexing between transport and logical channels, packet reassembly, deciphering, header decompression, control signal processing to recover IP packets from the UE 450. IP packets from the controller/processor 475 may be provided to the EPC 160. The controller/processor 475 is also responsible for error detection using an ACK and/or NACK protocol to support HARQ operations. As described elsewhere herein, the interface between a UE 450 and a base station 410 can be referred to as a "Uu" interface 490.

Figure 5:
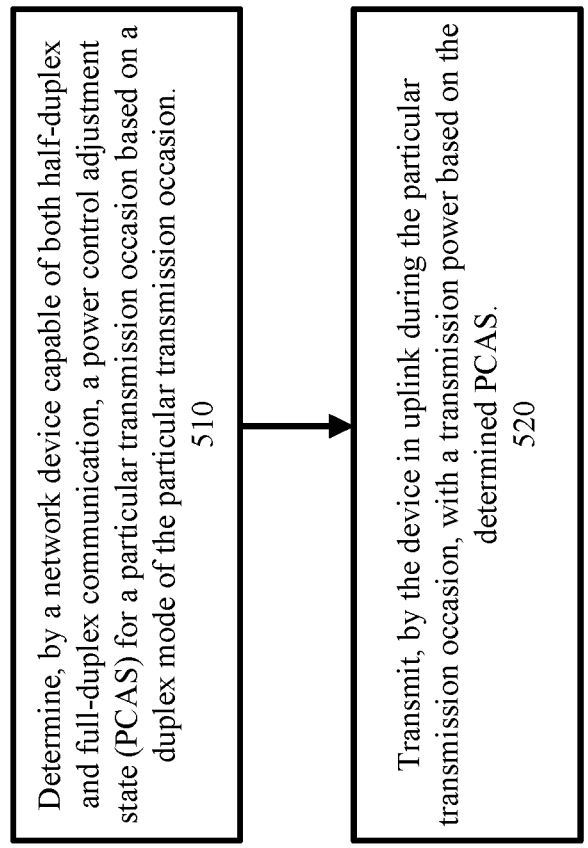
FIG. 5 is a flow diagram illustrating methods of wireless communication, in accordance with examples of the technology disclosed herein.

Referring to FIG. 5, and continuing to refer to prior figures for context, methods 500 for wireless communication are illustrated, in accordance with examples of the technology disclosed herein. Such methods 500 find use in the context of a network device, such a UE 450, capable of both half-duplex mode communication and full-duplex mode communication. In such methods, the network device determines a power control adjustment state (PCAS) for a particular transmission occasion based on a duplex mode of the particular transmission occasion—Block 510.

Figure 8:
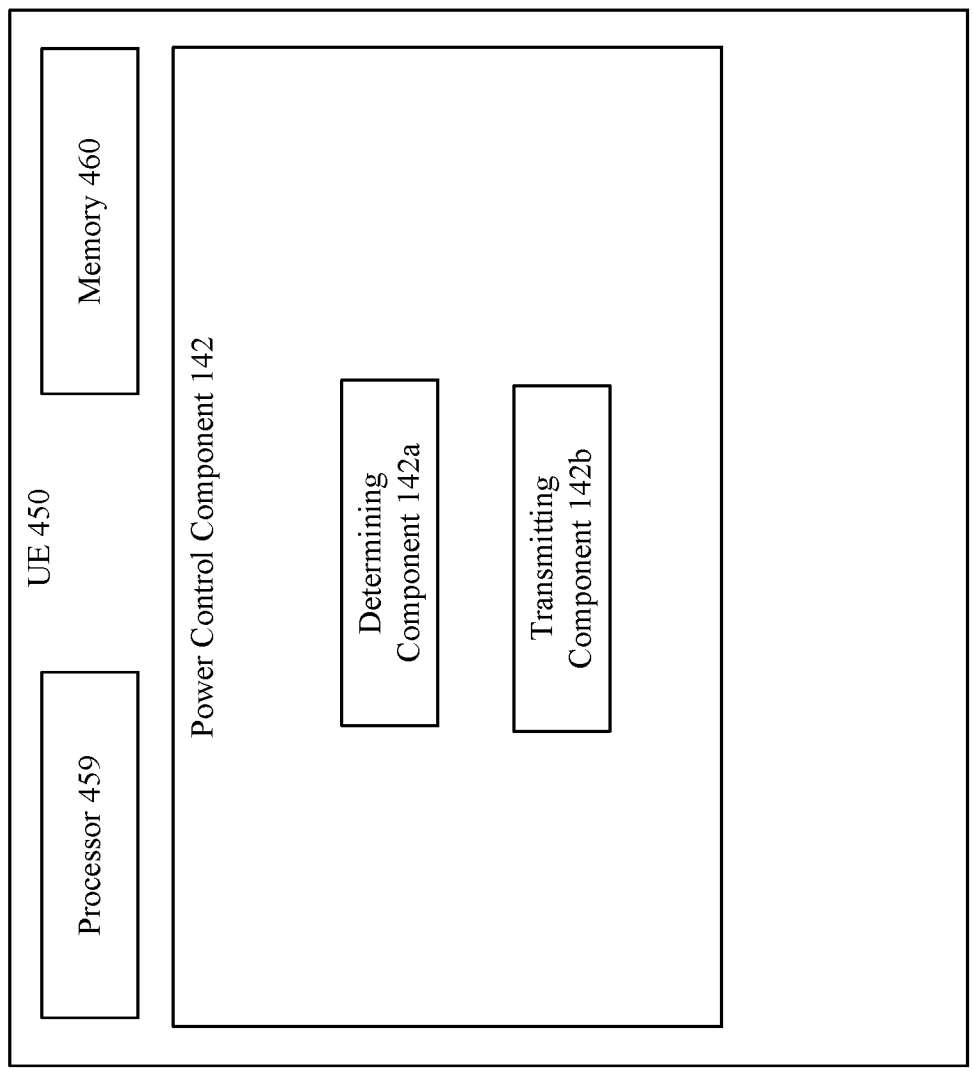
FIG. 8 is a block diagram of a UE, in accordance with examples of the technology disclosed herein.

Referring to FIG. 8, and continuing to refer to prior figures for context, another representation of the UE 450 (such as UE 104a) for wireless communication of FIG. 4 is shown, in accordance with examples of the technology disclosed herein. UE 450 includes power control component 142, controller/processor 459, and memory 460, as described in conjunction with FIG. 4 above. Power control component 142 includes determining component 142a. In some examples, the determining component 142a determines a power control adjustment state (PCAS) for a particular transmission occasion based on a duplex mode of the particular transmission occasion. Accordingly, determining component 142a may provide means for determining a power control adjustment state (PCAS) for a particular transmission occasion based on a duplex mode of the particular transmission occasion Absent the present technology, transmission power (in particular, for PUSCH) is determined as per Equation (1) below—regardless of the duplex mode of the transmission occasion.

$$P_{PUSCH,b,f,c}(i, j, q_d, l) = \min\begin{Bmatrix} P_{CMAX,f,c}(i), \\ P_{O\_PUSCH,b,f,c}(j) + 10\log_{10}(2^\mu \cdot M^{PUSCH}_{RB,b,f,c}(i)) + \alpha_{b,f,c}(j) \cdot \\ PL_{b,f,c}(q_d) + \Delta_{TF,b,f,c}(i) + f_{b,f,c}(i, l) \end{Bmatrix} [dBm] \quad (1)$$

In that case, PCAS is given by the last term, $f_{b,f,c}(i, 1)$, as the PUSCH power control adjustment state l for active UL BWP b of carrier f of serving cell c and PUSCH transmission occasion i. In particular, for PUSCH, PCAS is determined as per Equation (2) below. A similar approach is taken with respect to both PUCCH and SRS.

$$f_{b,f,c}(i,l) = f_{b,f,c}(i-i_0,l) + \sum_{m=0}^{\mathcal{C}(D_i)-1} \delta_{PUSCH,b,f,c}(m,l) \quad (2)$$

In some examples of the technology disclosed herein, half-duplex PCAS and full-duplex PCAS are determined by separate functions, e.g., $f_{b,f,c,half\text{-}duplex}(i, 1)$ and $f_{b,f,c,full\text{-}duplex}(i, 1)$, respectively. In some such examples, the power state is applied with different function when the transmission occasion i is in a full-duplex slot versus when the transmission occasion i is in a half-duplex slot. The duplex mode is determined based on the duplex mode of the transmission occasion i or slot-type of the transmission occasion i.

In some examples, the PCAS is a function of an index l and l is a value from a plurality of sets of PCAS index values; and the sets of PCAS index values comprise a separate set of PCAS index values for each duplex communication mode. In some such examples, the number of PCAS states l remains at two. In some such examples, the number of PCAS states l is increased, e.g., l={0, 1} for half-duplex and l={2, 3} for full-duplex.

Figure 6:
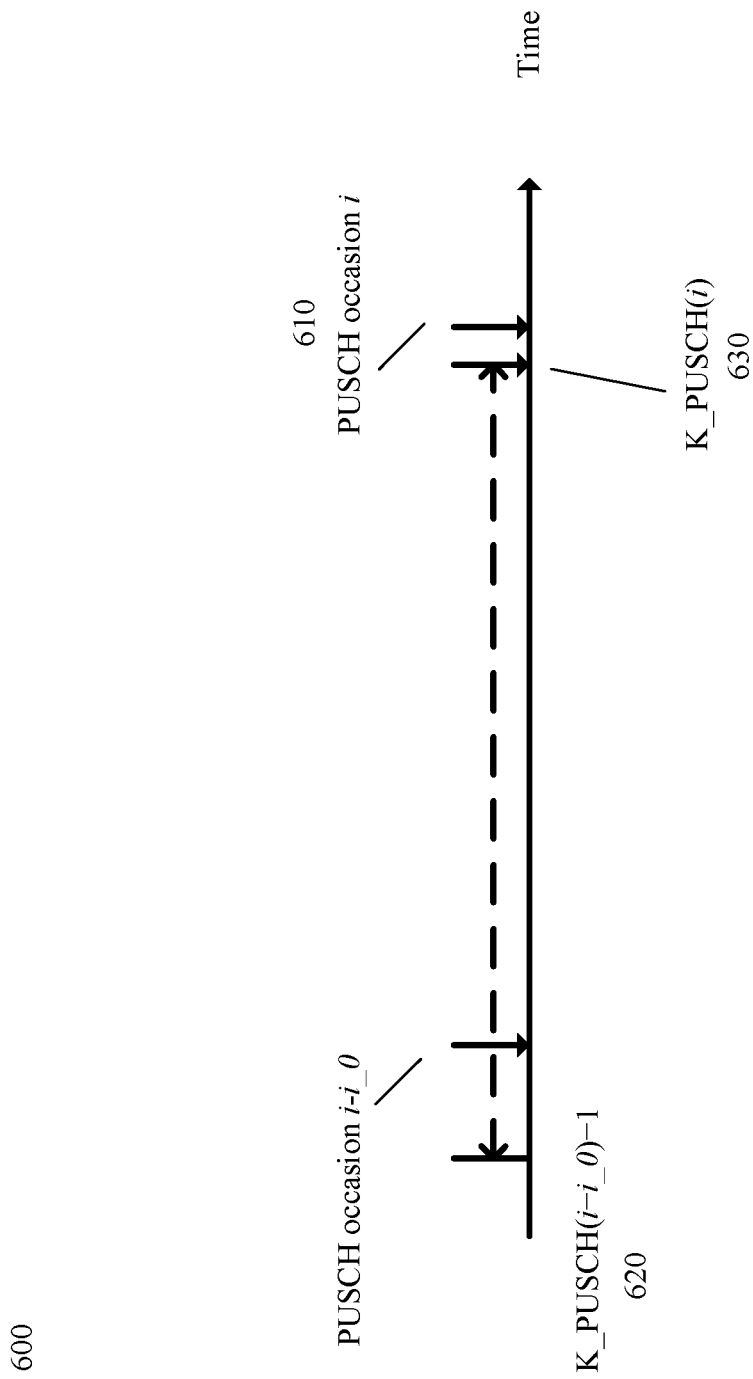
FIG. 6 is a notional sequence for accumulating TPC command values, in accordance with examples of the technology disclosed herein.

Referring to FIG. 6, and continuing to refer to prior figures for context, a notional sequence 600 for accumulating TPC command values is shown. Absent the present technology, the PCAS for a transmission occasion i 610 can be determined by summation over the TPCs from K_PUSCH(i-i_0)-1 620 to K_PUSCH(i) 630. In some examples of the technology disclosed herein, determining a PCAS comprises accumulating transmit power control (TPC) command values for half duplex transmission occasions separately from accumulating TPC command values for full duplex transmission occasions. One way to express the approach of such examples is via Equation (3), where "FD or HD" are two sets of indices for TPC received for PUSCH occasions falling in a FD slot and TPC received for PUSCH occasions falling in a HD slot.

$$f_{b,f,c}(i,l) = f_{b,f,c}(i-i_0,l) + \sum_{m \in C(FDorHD)}^{\mathcal{C}(D_i)-1} \delta_{PUSCH,b,f,c}(m,l) \quad (2)$$

Figure 7:
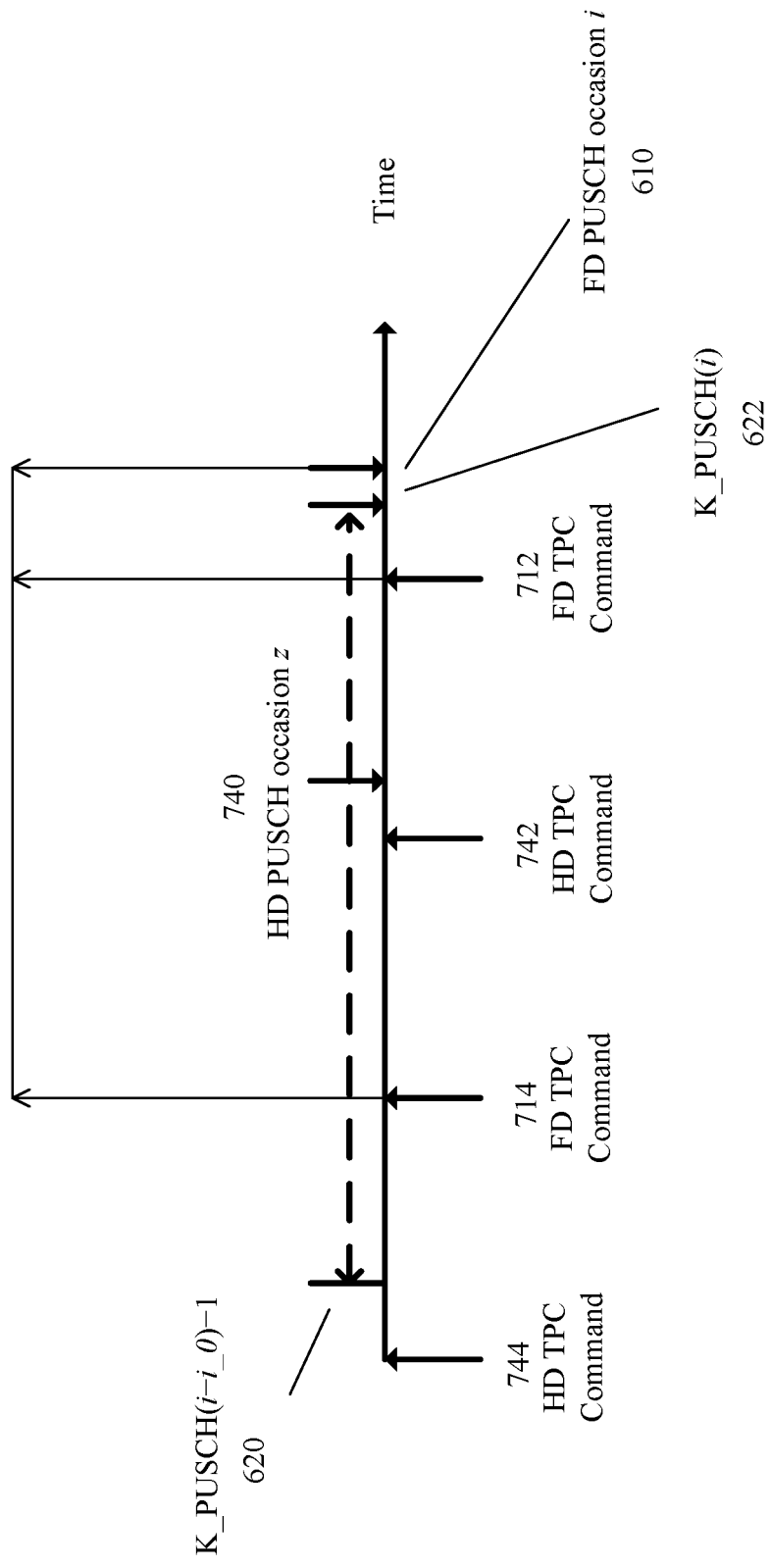
FIG. 7 is a notional sequence for accumulating duplex mode-specific TPC command values, in accordance with examples of the technology disclosed herein.

Referring to FIG. 7, and continuing to refer to prior figures for context, a notional sequence 700 for accumulating duplex mode specific TPC command values is shown, in accordance with examples of the technology disclosed herein. In such examples, determining a PCAS includes accumulating TPC command values for half duplex transmission occasions separately from accumulating TPC command values for full duplex transmission occasions. In FIG. 7, for FD PUSCH occasion i 610, the UE begins accumulating TPC command values after K_PUSCH(i-i_0)-1 620. In the example of FIG. 7, the UE accumulates TPC command values from FD TPC command 714 and FD TPC command 712—but not from HD TPC command 742. HD TPC command 742 is within the K_PUSCH(i-i_0)-1 620 to K PUSCH(i) 622 window, but is not a TPC associated with FD transmission occasions—so the value of the HD TPC command 742 is not accumulated when determining PCAS for FD PUSCH occasion i.

In some such examples, accumulating TPC command values for a given transmission occasion includes accumulating TPC command values only during one or more transmission occasions of a same duplex mode as the given transmission occasion. In some such examples, accumulating TPC command values for a given transmission occasion comprises accumulating TPC command values as indicated by a network in which the network device operates—such as through RRC information elements.

In some examples, determining a PCAS comprises the UE 450 interpreting a transmit power control (TPC) command based on the duplex mode for the transmission occasion. In some such examples, UE 450 is configured (whether at manufacturing or via the network/base station 410) with a different interpretation for the TPC command values depending on the transmission occasion i duplex type. In some implementations of this example, the mapping between TPC command values and dB value for depends not only on the channel/signal and the accumulation/absolute mode of the transmission occasion, but also on the duplex mode of the transmission occasion. For example, implementations in the fashion of 3GPP TS 38.213 V17.2.0 (2022-06) Release 17 would indicate the second and third columns for HD transmission occasions and the third and fourth columns for FD transmission occasions, as shown in TABLE 1 below. Instead of defining a new table or new columns, the interpretation can be relative (e.g., add specific offset to the HD entry).

TABLE 1

| TPC Command Field | Accumulated $\delta_{PUSCH,b,f,c,HD}$ or $\delta_{SRS,b,f,c,HD}$ [dB] | Absolute $\delta_{PUSCH,b,f,c,HD}$ or $\delta_{SRS,b,f,c}$,HD [dB] | Accumulated $\delta_{PUSCH,b,f,c,FD}$ or $\delta_{SRS,b,f,c,FD}$ [dB] | Absolute $\delta_{PUSCH,b,f,c,FD}$ or $\delta_{SRS,b,f,c,FD}$ [dB] |
|---|---|---|---|---|
| 0 | −1 | −4 | −3 | −3 |
| 1 | 0 | −1 | 1 | 0 |
| 2 | 1 | 1 | 3 | 1 |
| 3 | 3 | 4 | 4 | 4 |

In some examples, determining a PCAS for a full duplex transmission occasion comprises determining one of an accumulated PCAS and an absolute PCAS based on one of: i) an accumulated/absolute configuration of the half duplex mode communication mode of the network device, ii) a radio resource control (RRC) full duplex mode communication mode accumulated/absolute parameter of the network device, and iii) a network device-configured full duplex mode communication mode accumulated/absolute parameter.

Referring to FIG. 5 again, the device transmits in uplink during the particular transmission occasion with a transmission power based on the determined PCAS. For example, the UE transmits with a transmission power determined by Equation (1) as modified by any of the duplex mode dependent PCAS described above.

Referring again to FIG. 8, and continuing to refer to prior figures for context, . . . component 142 includes transmission component 142b. In some examples, the transmission component 142b transmits in uplink during the particular transmission occasion with a transmission power based on the determined PCAS. Accordingly, transmission component 142b may provide means for transmits in uplink during the particular transmission occasion with a transmission power based on the determined PCAS.

The following examples are illustrative only and aspects thereof may be combined with aspects of other embodiments or teaching described herein, without limitation. The technology disclosed herein includes method, apparatus, and computer-readable media including instructions for wireless communication. Such technology finds use in the context of a UE capable of both half-duplex mode communication and full-duplex mode communication.

Example 1 includes methods, apparatuses, and computer readable media for wireless communication, in which, the UE determines a power control adjustment state (PCAS) for a particular transmission occasion based on a duplex mode of the particular transmission occasion. The UE then transmits, in uplink during the particular transmission occasion, with a transmission power based on the determined PCAS.

Example 2 includes the Example 1, wherein determining includes determining the PCAS using a PCAS function specific to the duplex mode of the particular transmission occasion. Example 3 includes any one or more of Example 1 and Example 2, wherein the PCAS is a function of an index 1, where 1 is a value from a plurality of sets of PCAS index values. In such examples, the sets of PCAS index values comprise a separate set of PCAS index values for each duplex communication mode.

Example 4 includes any one or more of Example 1-Example 3, wherein determining a PCAS includes accumulating transmit power control (TPC) command values for half-duplex transmission occasions separately from accumulating TPC command values for full-duplex transmission occasions. Example 5 includes any one or more of Example 1-Example 4, wherein accumulating TPC command values for a given transmission occasion includes accumulating TPC command values only during one or more transmission occasions of a same duplex mode as the given transmission occasion. Example 6 includes any one or more of Example 1-Example 5, wherein accumulating TPC command values for a given transmission occasion includes accumulating TPC command values as indicated by a network in which the network device operates. Example 7 includes any one or more of Example 1-Example 6, wherein determining a PCAS includes interpreting a transmit power control (TPC) command based on the duplex mode for the transmission occasion. Example 8 includes any one or more of Example 1-Example 7, determining a PCAS for a full-duplex transmission occasion includes determining one of an accumulated PCAS and an absolute PCAS based on one of: i) an accumulated/absolute configuration of the half-duplex mode communication mode of the network device, ii) a radio resource control (RRC) full-duplex mode communication mode accumulated/absolute parameter of the network device, and iii) a network device-configured full-duplex mode communication mode accumulated/absolute parameter.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

We claim:

1. A method for uplink power control, comprising:
   determining, by a network device capable of both half-duplex mode communication and full-duplex mode communication, a power control adjustment state (PCAS) for a particular transmission occasion based on a duplex mode of the particular transmission occasion; and
   transmitting, by the device in uplink during the particular transmission occasion, with a transmission power based on the determined PCAS.

2. The method of claim 1, wherein determining comprises determining the PCAS using a PCAS function specific to the duplex mode of the particular transmission occasion.

3. The method of claim 1, wherein:
   the PCAS is a function of an index l and l is a value from a plurality of sets of PCAS index values; and
   the sets of PCAS index values comprise a separate set of PCAS index values for each duplex communication mode.

4. The method of claim 1, wherein determining a PCAS comprises accumulating transmit power control (TPC) command values for half-duplex transmission occasions separately from accumulating TPC command values for full-duplex transmission occasions.

5. The method of claim 4, wherein accumulating TPC command values for a given transmission occasion comprises accumulating TPC command values only during one or more transmission occasions of a same duplex mode as the given transmission occasion.

6. The method of claim 4, wherein accumulating TPC command values for a given transmission occasion comprises accumulating TPC command values as indicated by a network in which the device operates.

7. The method of claim 1, wherein determining a PCAS comprises interpreting a transmit power control (TPC) command based on the duplex mode for the transmission occasion.

8. The method of claim 1, wherein determining a PCAS for a full-duplex transmission occasion comprises determining one of an accumulated PCAS and an absolute PCAS based on one of:
   i) an accumulated/absolute configuration of the half-duplex mode communication mode of the network device,
   ii) a radio resource control (RRC) full-duplex mode communication mode accumulated/absolute parameter of the network device, and
   iii) a network device-configured full-duplex mode communication mode accumulated/absolute parameter.

9. An apparatus for wireless communication, comprising:
   a memory; and
   at least one processor coupled to the memory, the memory including instructions executable by the at least one processor to cause the apparatus to:
      determine, by the apparatus capable of both half-duplex mode communication and full-duplex mode communication, a power control adjustment state (PCAS) for a particular transmission occasion based on a duplex mode of the particular transmission occasion; and
      transmit, by the apparatus in uplink during the particular transmission occasion, with a transmission power based on the determined PCAS.

10. The apparatus of claim 9, wherein determining comprises determining the PCAS using a PCAS function specific to the duplex mode of the particular transmission occasion.

11. The apparatus of claim 9, wherein:
   the PCAS is a function of an index l and l is a value from a plurality of sets of PCAS index values; and
   the sets of PCAS index values comprise a separate set of PCAS index values for each duplex communication mode.

12. The apparatus of claim 9, wherein determining a PCAS comprises accumulating transmit power control (TPC) command values for half-duplex transmission occasions separately from accumulating TPC command values for full-duplex transmission occasions.

13. The apparatus of claim 12, wherein accumulating TPC command values for a given transmission occasion comprises accumulating TPC command values only during one or more transmission occasions of a same duplex mode as the given transmission occasion.

14. The apparatus of claim 12, wherein accumulating TPC command values for a given transmission occasion comprises accumulating TPC command values as indicated by a network in which the apparatus operates.

15. The apparatus of claim 9, wherein determining a PCAS comprises interpreting a transmit power control (TPC) command based on the duplex mode for the transmission occasion.

16. The apparatus of claim 9, wherein determining a PCAS for a full-duplex transmission occasion comprises determining one of an accumulated PCAS and an absolute PCAS based on one of:
   i) an accumulated/absolute configuration of the half-duplex mode communication mode of the apparatus,
   ii) a radio resource control (RRC) full-duplex mode communication mode accumulated/absolute parameter of the apparatus, and
   iii) an apparatus configured full-duplex mode communication mode accumulated/absolute parameter.

17. A non-transitory computer-readable medium storing processor-executable code, the code when read and executed by at least one processor of user equipment (UE), causes the UE to:
   determine, by the UE capable of both half-duplex mode communication and full-duplex mode communication, a power control adjustment state (PCAS) for a particular transmission occasion based on a duplex mode of the particular transmission occasion; and
   transmit, by the UE in uplink during the particular transmission occasion, with a transmission power based on the determined PCAS.

18. The computer-readable medium of claim 17, wherein determining comprises determining the PCAS using a PCAS function specific to the duplex mode of the particular transmission occasion.

19. The computer-readable medium of claim 17, wherein:
   the PCAS is a function of an index l and l is a value from a plurality of sets of PCAS index values; and
   the sets of PCAS index values comprise a separate set of PCAS index values for each duplex communication mode.

20. The computer-readable medium of claim 17, wherein determining a PCAS comprises accumulating transmit power control (TPC) command values for half-duplex transmission occasions separately from accumulating TPC command values for full-duplex transmission occasions.

21. The computer-readable medium of claim 20, wherein accumulating TPC command values for a given transmission occasion comprises accumulating TPC command values only during one or more transmission occasions of a same duplex mode as the given transmission occasion.

22. The computer-readable medium of claim 20, wherein accumulating TPC command values for a given transmission occasion comprises accumulating TPC command values as indicated by a network in which the UE operates.

23. The computer-readable medium of claim 17, wherein determining a PCAS comprises interpreting a transmit power control (TPC) command based on the duplex mode for the transmission occasion.

24. The computer-readable medium of claim 17, wherein determining a PCAS for a full-duplex transmission occasion comprises determining one of an accumulated PCAS and an absolute PCAS based on one of:
   i) an accumulated/absolute configuration of the half-duplex mode communication mode of the UE,
   ii) a radio resource control (RRC) full-duplex mode communication mode accumulated/absolute parameter of the UE, and
   iii) a UE-configured full-duplex mode communication mode accumulated/absolute parameter.

25. An apparatus for wireless communications, comprising:
   means for determining, by a network device capable of both half-duplex mode communication and full-duplex mode communication, a power control adjustment state (PCAS) for a particular transmission occasion based on a duplex mode of the particular transmission occasion; and
   means for transmitting, by the device in uplink during the particular transmission occasion, with a transmission power based on the determined PCAS.

26. The apparatus of claim 25, wherein determining comprises determining the PCAS using a PCAS function specific to the duplex mode of the particular transmission occasion.

27. The apparatus of claim 25, wherein:
   the PCAS is a function of an index l and l is a value from a plurality of sets of PCAS index values; and
   the sets of PCAS index values comprise a separate set of PCAS index values for each duplex communication mode.

28. The apparatus of claim 25, wherein determining a PCAS comprises accumulating transmit power control (TPC) command values for half-duplex transmission occasions separately from accumulating TPC command values for full-duplex transmission occasions.

29. The apparatus of claim 28, wherein accumulating TPC command values for a given transmission occasion comprises accumulating TPC command values only during one or more transmission occasions of a same duplex mode as the given transmission occasion.

30. The apparatus of claim 28, wherein accumulating TPC command values for a given transmission occasion comprises accumulating TPC command values as indicated by a network in which the network device operates.

31. The apparatus of claim 25, wherein determining a PCAS comprises interpreting a transmit power control (TPC) command based on the duplex mode for the transmission occasion.

32. The apparatus of claim 25, wherein determining a PCAS for a full-duplex transmission occasion comprises determining one of an accumulated PCAS and an absolute PCAS based on one of:
   i) an accumulated/absolute configuration of the half-duplex mode communication mode of the network device,
   ii) a radio resource control (RRC) full-duplex mode communication mode accumulated/absolute parameter of the network device, and
   iii) a network device-configured full-duplex mode communication mode accumulated/absolute parameter.

\* \* \* \* \*